Sept. 15, 1959   A. E. CIEPLY, JR   2,904,134
SPEED RESPONSIVE CONTROL FOR ANTICREEP DEVICE
Filed April 25, 1955

Inventor:
Adam E. Cieply Jr.
By Gary, Desmond & Parker
Attys.

United States Patent Office 2,904,134
Patented Sept. 15, 1959

2,904,134

SPEED RESPONSIVE CONTROL FOR ANTICREEP DEVICE

Adam E. Cieply, Jr., Chicago, Ill., assignor to Gaylord Products, Incorporated, Chicago, Ill., a corporation of Delaware Application April 25, 1955, Serial No. 503,406

5 Claims. (Cl. 188—152)

This invention relates to improvements in a speed responsive control apparatus for an automotive anticreep device and refers particularly to a control apparatus which functions to maintain an anticreep device operative when the automotive vehicle is stationary or when it is moving at a predetermined minimum speed.

Conventional anticreep devices, that is, devices employed on automotive vehicles, having automatic transmissions and hydraulic torque conversion, to prevent undesirable slow movement or creeping of the vehicle when it is intended that the vehicle remain stationary while still in "drive," usually comprise a valve interposed in the hydraulic brake line operated by a solenoid; an electric switch controlled by the vehicle's accelerator pedal and closed when the accelerator is undepressed; said switch being in series with said valve solenoid; and a speed responsive electric switch in series with the accelerator switch and valve solenoid which remains open while the vehicle is in motion but closes when the vehicle stops or moves at a relatively low speed to close the solenoid circuit and confine the liquid under pressure in the cylinders of the hydraulic braking system to prevent creeping of the vehicle.

The present invention is particularly directed to a speed responsive control switch which may be employed in a system such as hereinbefore described.

The objects, advantages and features of the present invention will be apparent from the accompanying drawing and following detailed description.

In automotive vehicles having automatic transmissions and hydraulic torque converters, there is a tendency for the vehicle to move or creep when the transmisison is in gear and when the engine is idling unless the idling speed of the engine is perfectly adjusted. Even though the idling speed of the engine may be perfectly adjusted, conditions arise wherein this undesirable creeping takes place, for instance, when the engine of the automotive vehicle is cold, thermostatic throttle controls usually employed on automotive engines increase the idling speed until the engine reaches a predetermined temperature at which time the engine idles at its normal idling speed. However, during this period wherein the engine idling speed is increased, the vehicle will tend to creep. In addition, if the vehicle rests on an incline, even though the idling speed may be satisfactorily adjusted for level conditions of the vehicle, the vehicle will tend to creep downwardly along the incline.

Figure 1:
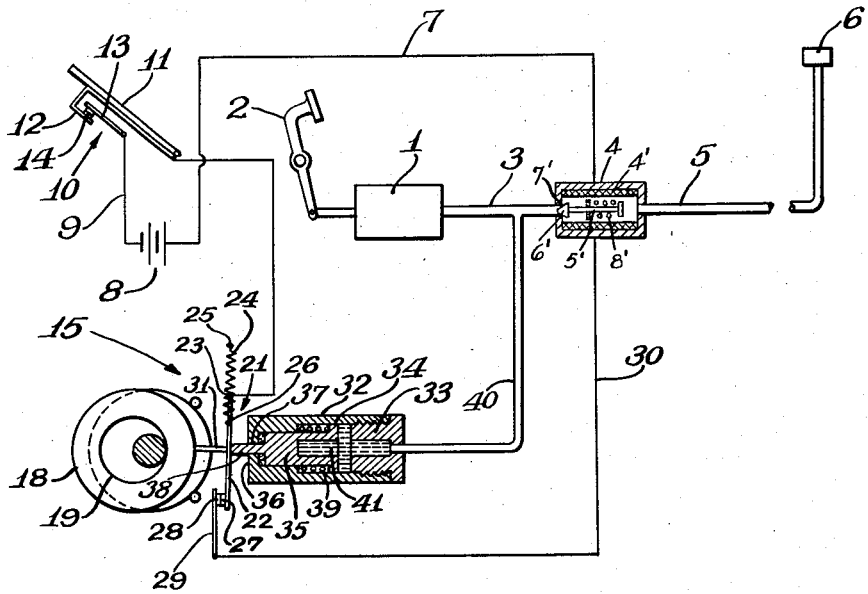
Fig. 1 is a partially diagrammatic view of an anticreep arrangement employing the speed-responsive control embodying the concepts of the present invention.

Referring particularly to Fig. 1, a diagrammatic view of such an anticreep arrangement is shown. In the diagrammatic arrangement, 1 indicates a master brake cylinder containing the usual brake fluid which may be pressurized by depressing the brake pedal 2. A brake line 3 is connected to the master cylinder 1 and a solenoid operated valve 4 is interposed in the brake line 3. The other side of the solenoid valve 4 is connected to a brake line 5 which in turn connects with the various wheel cylinders of the vehicle, only one of which is illustrated, being designated by the numeral 6.

The solenoid-operated valve 4 comprises a solenoid 4' within which a plunger 5' is slidably movable. The plunger 5' at one of its ends carries a valve member 6' which, when the solenoid 4' is energized, seats upon a seat 7' thereby closing communication between pipes 3 and 5. When the solenoid 4' is deenergized the pressure in pipe 5 assisted by pressure spring 8' unseats the valve member 6' establishing communication between pipes 3 and 5. However, when the valve member 6' is seated, that is, when the solenoid is energized, pressure from the master cylinder 1 can unseat the valve and establish the master cylinder pressure in the wheel cylinder 6.

One side of the solenoid which controls the solenoid valve 4 is connected by means of an electrical conductor 7 to battery 8, the opposite side of the battery being connected by conductor 9 to accelerator switch 10 which is mounted upon accelerator pedal 11. The accelerator switch 10 comprises a switch arm 12 which is mounted upon the accelerator pedal and a switch arm 13, said arms having switch points 14. The arrangement is such that when the accelerator pedal is undepressed the contacts 14 are closed and the circuit between battery 8 and solenoid 4 is completed. When the accelerator pedal 11 is depressed the contact points 14 are opened and the circuit from battery 8 to solenoid valve 4 is opened.

In series with the accelerator switch 10 the battery 8 and solenoid valve 4 is a speed responsive control device indicated generally by the reference numeral 15.

The device 15 comprises a shaft 16 which is to be connected to a rotating part carried by the automotive vehicle, for instance, the shaft 16 may be connected to the speedometer cable (not shown) of the vehicle. A pair of discs 17 are rigidly mounted upon the shaft 16 and are disposed in plane-parallel spaced relationship with respect to each other. A driven disc 18 circumscribes shaft 16, said disc being disposed in plane-parallel relationship between the driving discs 17, the disc 18 being provided with a relatively enlarged central aperture 19 whereby the disc may move radially with respect to shaft 16.

Material 20 having a relatively high viscosity and shear strength is interposed between the two driving discs 17 and the driven disc 18 whereby said plastic material frictionally connects the driving discs to the driven disc.

The arrangement hereinbefore described embodies the basic concepts of the invention described in copending application Serial No. 505,478, filed May 2, 1955, in the name of Lewis E. Thatcher, now Patent 2,781,430, granted Febraury 12, 1957. The characteristics of the disc arrangement hereinbefore described and completely set forth in said application for patent is characterized in that when a radial force is applied to the periphery of the driven disc 18 it tends to move said disc radially with respect to the driving discs 17, that is, it tends to move the driven disc 18 to an eccentric position with respect to the driving discs. The force applied to the periphery of the driven disc toward the axis of rotation thereof is opposed by the viscosity and shear strength of the plastic material 20.

In the present invention this radial movement of the driven disc is employed to function as a speed responsive control for the anticreep mechanism hereinbefore described.

The control device 15 also comprises an electric switch 21 which includes a pivoted switch arm 22 pivoted at point 23. A coil spring 24 is anchored at point 25 at one end and is secured to the arm 22 at 26 at its other end. The switch 21 is referred to as an "over-center" switch and its characteristics are such that when the arm is canted to a predetermined position in a counterclockwise direction about pivot 23, as viewed in Fig. 1, the spring 24 tends to hold the arm in said position. When the arm 22 is canted in a clockwise direction about the pivot point 23 the spring 24 tends to hold the arm in this position. In other words, the spring 24, when the arm 22 moves in one direction or the other beyond a central position, tends to augment the movement.

The switch arm 22 carries contact point 27 which is juxtaposed with respect to contact point 28 carried upon a stationary arm 29. The stationary arm 29 is connected by means of conductor 30 to the opposite side of the solenoid carried in the solenoid valve 4. Thus, the switch 21 is in series with the accelerator switch 10, the battery 8 and the solenoid carried in solenoid valve 4.

Figure 3:
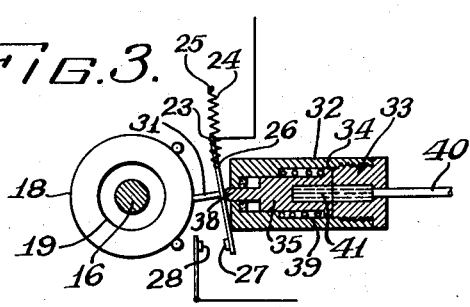
Fig. 3 is a fragmentary sectional view of the control device, as illustrated in Fig. 1, but with the control switch in open position.

The switch arm 22 carries a contact pin 31 which extends toward the periphery of the driven disc 18 and is maintained in contact with said periphery as will be hereinafter more fully described. Adjacent the switch arm 22 is a cylinder 32 which is closed at one end by means of a thereaded plug 33. The cylinder 32 is provided with a bore 34 in which a slidable piston 35 is positioned. Wall 36 of the cylinder 32 is provided with a central aperture 37 through which a contact finger 38 carried by piston 35 extends. A coil spring 39 is positioned within the bore 34 and bears upon piston 35 tending to move said piston to the right, as viewed in Figs. 1 and 3. A pipe 40 connects at one end into the pipeline 3 and at the opposite end connects into bore 34.

The arrangement is such that when no pressure is applied to the fluid in the master cylinder 1 the spring 39 tends to move piston 35 to the right, as viewed in Fig. 1, and permit the separation of switch points 27 and 28. When the brake pedal 2 is depressed and fluid pressure is established in the master cylinder 1, fluid under pressure 41 is introduced into the cylinder 32 and hence piston 35 is acted upon by said fluid under pressure and the piston moves to the left, as viewed in Fig. 1. This movement of piston 35 causes the finger 38 to project into contact with switch arm 22 and hence said switch arm will be rocked in a clockwise direction about pivot point 23, as viewed in Figs. 1 and 3.

In order to describe the operation of the present invention different situations encountered in the mainipulation of an automotive vehicle will be assumed and the operation of the device in these different situations will be described.

Assuming that the automotive vehicle is stationary and that arm 22 is in the position which closes contact points 27 and 28, pin 31 will be so disposed as to urge driven disc 18, under the influence of spring 24, to an eccentric position with respect to the driving discs 17. Also assuming that no braking pressure has been applied to the fluid in the braking system, piston 35 is retracted and finger 38 is in spaced relationship to switch arm 22.

If it is assumed that the vehicle is then placed in motion, shaft 16 will rotate and discs 17 will also rotate. A force will then be exerted upon the driven disc 18 and toward the axis of rotation thereof which tends to move said driven disc into a more or less concentric position with respect to the driving disc 17. Such movement, of course, will be opposed by spring 24 until the switch arm moves past its center position at which time the arm 22 rocks, under the influence of spring 24 in a counterclockwise direction about the pivot point 23, as viewed in Figs. 1 and 3. Thus, when the arm 22 has been so moved as to open contacts 27 and 28 and the circuit 2, the solenoid carried by solenoid valve 4, is opened. Let it now be assumed that with the vehicle traveling at a normal rate of speed the brake pedal 2 is manipulated to retard the motion of the vehicle. Under these conditions two possibilities exist. The brake pedal may be manipulated merely to retard the movement of the vehicle without completely stopping it or the brake pedal may be manipulated to not only retard the vehicle but to completely stop it. The operation of the present device will be hereinafter described under both of these conditions.

If the vehicle is merely slowed down but is permitted to retain its motion, the following operation takes place. When the operator depresses the brake pedal 2 he normally releases pressure upon the accelerator pedal 11 and hence switch 10 closes. However, in view of the fact that fluid under pressure is established in the master brake cylinder 1 fluid under pressure will be transferred to cylinder 32 and piston 35 will project finger 38 outwardly into contact with switch arm 22 and the contact points 27 and 28 will also be closed. This operation, of course, energizes solenoid valve 4 and prevents the return flow of fluid under pressure from the wheel cylinders to the master cylinder. However, the energizing of solenoid valve 4 does not prevent passage of fluid under pressure from the master cylinder to the wheel cylinders. When the finger 38 contacts switch arm 22 to close the contact pin 31 bears against the periphery of the driven disc 18 and moves said disc to an eccentric position.

When the vehicle has been slowed down to the desired rate of speed, but is still in motion, and the operator releases pressure from the brake pedal 2, piston 35 is retracted and inasmuch as shaft 16 still rotates, the driven disc 18 moves to a substantially concentric position with respect to the driving discs 17 and hence switch points 27 and 28 are opened and fluid under pressure is released from the wheel cylinders 6.

Accordingly, while the vehicle is in motion switch 21 will never be closed except when the operator applies the brake pressure and the said switch will only be closed while the operator is applying said brake pressure. Hence, when the vehicle is in motion the switch 21 will never cause braking fluid under pressure to be inadvertently confined in the wheel cylinder 6.

In the situation wherein the brake pedal 2 is manipulated and it is the intention of the operator to completely stop the vehicle, the following operation takes place: With the vehicle in movement, the driven disc 18 will be in substantially concentric position and hence switch 21 will be open. When brake pressure is applied to the master cylinder 1, cylinder 35 is so moved as to project finger 38 into contact with switch arm 22 and pin 31 offsets the driven disc 18 and switch 21 is thereby closed. Thus, while braking pressure is being established switch 21 will be closed, and in view of the fact that the operator's foot is on the brake pedal 2, switch 10 will be closed and hence solenoid valve 4 will be energized. Under the assumption made this condition persists until the vehicle stops and hence shaft 16 becomes stationary. Accordingly, after the vehicle stops and the operator releases his foot from the brake pedal 2 fluid pressure will be relieved in master cylinder 1 and cylinder 35 will be retracted by spring 39. However, in view of the fact that the shaft 16 is stationary, the driven disc 18 will not move switch arm 22 and hence solenoid valve 4 will remain energized and braking pressure will be established and maintained in the wheel cylinders 6. Thus while braking pressure is established in the wheel cylinders there will be no tendency of the vehicle to move or creep and hence the undesirable creeping is obviated.

Of course, to start the vehicle in motion, the operator must depress the accelerator pedal 11 which opens switch 10 and deenergizes solenoid valve 4 thereby releasing the previously confined fluid under pressure from the wheel cylinders 6 and the vehicle is free to move forwardly.

Figure 2:
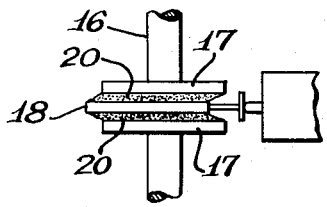
Fig. 2 is a fragmentary side elevational view of a portion of the control device.
Figure 4:
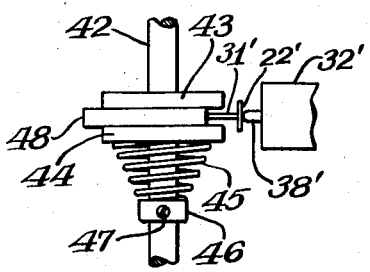
Fig. 4 is a fragmentary side elevational view of a modified form of control device.

Referring particularly to Fig. 4, a slightly modified form of the invention is illustrated and is adapted to supplant that portion of the control device 15 illustrated particularly in Fig. 2. In the modified form of the invention, 42 indicates a shaft which may be coupled to the speedometer cable, said shaft being rotated when the vehicle is in motion. A disc 43 is rigidly connected to shaft 42 and rotates therewith. A second disc 44 is loosely mounted upon shaft 42 and one end of a conical coil spring 45 is anchored upon disc 44, the opposite end of said spring being anchored upon a collar 46 rigidly secured to shaft 42 by means of set screw 47. A driven disc 48, similar to disc 18 loosely embraces shaft 42 and is frictionally confined between the driving disc 43 and the spring pressed driving disc 44. The disc 48 is associated with a pin 31' which is carried by a switch arm 22' which are respectively equivalent to the members 31 and 22 hereinbefore described. The switch arm 22' is disposed adjacent a cylinder 32' which is identical with the cylinder 32 hereinbefore described, the cylinder 32' carrying a piston similar to the piston 35 and having a projecting finger 38' similar to the finger 38 hereinbefore described.

In the form of the invention illustrated in Fig. 4 the operation of the device is identical to that hereinbefore described, the only difference being that the discs 43, 44 and 48 are associated together under the friction induced by the pressure of spring 45, as opposed to the viscous and shear strength of material 20. Otherwise the operation is identical.

It is apparent that modifications of the present invention may be made without departing from the spirit of the invention and hence it is not intended that the invention be limited to the precise elements illustrated and described except as necessitated by the appended claims.

I claim as my invention:

1. In a brake control device for an automotive vehicle having hydraulic brakes and having a solenoid-operated valve interposed in the brake line between the master brake cylinder and the wheel cylinders which when the solenoid is energized the valve closes and prevents release of fluid under pressure through said valve from said wheel cylinders back to said master cylinder, the combination with said solenoid-operated valve of a switch controlling the energization of the solenoid-operated valve, fluid pressure means disposed adjacent said switch connected to the brake line between the master brake cylinder and the solenoid-operated valve and operable by predetermined pressure in said brake line to close said switch when said pressure is established in said master brake cylinder, and control means disposed adjacent said switch responsive to a predetermined rate of movement of the vehicle to open said closed switch when said pressure is relieved from the master cylinder and the vehicle moves at said predetermined rate.

2. In a brake control device for an automotive vehicle having hydraulic brakes and having a solenoid-operated valve interposed in the brake line between the master brake cylinder and the wheel cylinders which when the solenoid is energized the valve is actuated to prevent the release of fluid under pressure through said valve from said wheel cylinders back to said master cylinder, the combination with said solenoid-operated valve of a switch controlling the energization of the solenoid-operated valve, hydraulic cylinder and piston means disposed adjacent said switch connected to the brake line between the master brake cylinder and the solenoid-operated valve, said piston being in movable contact with said switch to close said switch when predetermined pressure is established in said master brake cylinder, and friction-actuated control means disposed adjacent said switch responsive to a predetermined rate of movement of the vehicle for opening said switch when said pressure is relieved from the master cylinder and the vehicle moves at said predetermined rate.

3. In a brake control device for an automotive vehicle having hydraulic brakes and having a solenoid-operated valve interposed in the brake line between the master brake cylinder and the wheel cylinders which when the solenoid is energized the valve is actuated to prevent release of fluid under pressure through said valve from said wheel cylinders back to said master cylinder, the combination with said solenoid-operated valve of a switch controlling the energization of the solenoid-operated valve, hydraulic means disposed adjacent said switch connected to the brake line between the master brake cylinder and the solenoid-operated valve for closing said switch when predetermined pressure is established in said master brake cylinder, and control means disposed adjacent said switch responsive to a predetermined rate of movement of the vehicle for opening said switch when said pressure is relieved from the master cylinder and the vehicle moves at said predetermined rate, said control means comprising a shaft rotatable in proportion to the movement of the vehicle, a driving disc movable with said shaft, a driven disc eccentrically movable relative to said driving disc, resiliently urged contact means carried by said switch contacting said driven disc to position said driven disc in eccentric position when said switch is closed, and means frictionally engaging said driving and driven discs in face-to-face relationship whereby said driven disc is moved to concentric position to open said switch when said shaft rotates.

4. In a brake control device for an automotive vehicle having hydraulic brakes and having a solenoid-operated valve interposed in the brake line between the master brake cylinder and the wheel cylinders which when the solenoid is energized the valve is actuated to prevent release of fluid under pressure through said valve from said wheel cylinders back to said master cylinder, the combination with said solenoid-operated valve of a switch controlling the actuation of the solenoid-operated valve, hydraulic means disposed adjacent said switch connected to the brake line between the master brake cylinder and the solenoid-operated valve closing said switch when a predetermined pressure is established in said master brake cylinder, said hydraulic means comprising a cylinder connected to said brake line, a spring-biased piston movable against said spring in said cylinder in response to predetermined fluid pressure in said cylinder, means carried by said piston contacting said switch to close the same when pressure is established in said cylinder, and control means disposed adjacent said switch responsive to a predetermined rate of movement of the vehicle opening said switch when pressure is relieved from the master cylinder and the vehicle moves at said predetermined rate.

5. In a brake control device for an automative vehicle having hydraulic brakes and having a solenoid-operated valve interposed in the brake line between the master brake cylinder and the wheel cylinders which when the solenoid is energized the valve is actuated to prevent release of fluid under pressure through said valve from said wheel cylinders back to said master cylinder, the combination with said solenoid-operated valve of a switch controlling the actuation of the solenoid-operated valve, hydraulic means disposed adjacent said switch connected to the brake line between the master brake cylinder and the solenoid-operated valve closing said switch when predetermined pressure is established in said master brake cylinder, said hydraulic means comprising a cylinder connected to said brake line, a spring-biased piston movable against said spring in said cylinder in response to predetermined fluid pressure in said cylinder, means carried by said piston contacting said switch to close the same when predetermined pressure is established in said cylinder, control means disposed adjacent said switch responsive to a predetermined rate of movement of the vehicle to open said switch when pressure is relieved from the master cylinder and the vehicle moves at said predetermined rate, said control means comprising a shaft rotatable in proportion to the movement of the vehicle, a driving disc movable with said shaft, a driven disc eccentrically movable relative to said driving disc, resiliently urged contact means carried by said switch for contacting said driven disc to position said driven disc in eccentric position when said switch is closed, and means frictionally engaging said driving and driven discs in face-to-face relationship whereby said driven disc is moved to concentric position to open said switch when said shaft rotates.

References Cited in the file of this patent

UNITED STATES PATENTS

| | | |
|---|---|---|
| 2,183,803 | Betts | Dec. 19, 1939 |
| 2,594,155 | Guernsey et al. | Apr. 22, 1952 |
| 2,630,196 | Weiss et al. | Mar. 3, 1953 |
| 2,701,035 | Leichsenring | Feb. 1, 1955 |
| 2,762,476 | Gaylord et al. | Sept. 11, 1956 |